US005558567A

United States Patent [19]
Hedberg

[11] Patent Number: 5,558,567
[45] Date of Patent: Sep. 24, 1996

[54] CENTERLESS MACHINE

[75] Inventor: Olle Hedberg, Nonnens, Sweden

[73] Assignee: Lidköping Machine Tools AB, Likdöping, Sweden

[21] Appl. No.: 388,448

[22] Filed: Feb. 14, 1995

[51] Int. Cl.[6] .................................................. B24B 5/00
[52] U.S. Cl. ........................ 451/242; 451/246; 451/407
[58] Field of Search .................................. 451/242, 244, 451/245, 246, 407, 408, 443

[56] References Cited

U.S. PATENT DOCUMENTS

| | | | |
|---|---|---|---|
| 2,525,364 | 10/1950 | Mennesson | 451/242 |
| 2,855,729 | 10/1958 | Render | 451/242 |
| 2,862,338 | 12/1958 | Hill | 451/242 |
| 2,897,636 | 8/1959 | Pyne et al. | 451/407 |
| 3,903,655 | 9/1975 | Sommer | 451/242 |
| 4,091,571 | 5/1978 | Nilsson | 451/242 |

FOREIGN PATENT DOCUMENTS 367144  5/1974  Sweden.

*Primary Examiner*—D. S. Meislin
*Assistant Examiner*—Eileen P. Morgan
*Attorney, Agent, or Firm*—Burns, Doane, Swecker & Mathis LLP

[57] ABSTRACT

A device at centreless grinding machine incorporating a frame (1), a regulating wheel carriage (7) individually displaceably supported on guides (2) in the frame and supporting a regulating wheel (9), a grinding wheel carriage (3) individually displaceably supported on guides (2) in the frame and supporting a grinding wheel (4), said regulating and grinding wheels (9, 4) between them defining a grinding gap (10) of adjustable size, a work support (11) provided in the grinding gap, and dressing means for the regulating and grinding wheels, said grinding and regulating wheel carriages (3, 7) each being designed with at least two spaced apart supporting points (5a, 6a; 13a, 14a) relative to the guides, wherein said carriages are arranged in an overlapping relation thus that one supporting point (6a; 14a) for one of the said carriages (3; 7) is situated between the two supporting points (13a, 14a; 5a, 6a) for the other carriage (7; 3), for the purpose of compensating thermally dependent length variations at said carriages.

6 Claims, 2 Drawing Sheets 5,558,567

CENTERLESS MACHINE

BACKGROUND OF THE INVENTION

The present invention refers to centreless grinding machines of the type incorporating a frame, a regulating wheel carriage individually displaceably supported on guides in the frame and supporting a regulating wheel, a grinding wheel carriage individually displaceably supported on guides in the frame and supporting a grinding wheel, said regulating and grinding wheels between them defining a grinding gap of adjustable size, a work support provided in the grinding gap, and dressing means for the regulating and grinding wheels, said grinding and regulating carriages each being designed with at least two spaced apart supporting points relative to the guides.

The centreless grinding machine is traditionally used mainly for machining long series of workpieces. With today's demands for reduced stock-keeping there is a desire to be able to use the machine also for machining of shorter series.

When grinding a workpiece to desired measure between the grinding wheel and the regulating wheel under support from the work support provided in the grinding gap, heat is generated during the material removal, which heat primarily is transferred into the grinding wheel carriage and into the regulating wheel carriage. These carriages thereby are subjected to thermal expansion, whereby the size of the grinding gap between the grinding and regulating wheels is reduced. During continued grinding the heat will spread also to the machine frame, whereby the thermally conditioned, mutual movement of the grinding and regulating wheel carriages is compensated to a certain part. The thermal expansion of the grinding wheel carriage itself may amount to between 20 and 30 µm, and as the demand for accuracy of the machined workpiece may amount to some few µm, it is easy to understand that the conventional centreless grinding machine is not well suited for machining of short series of workpieces but needs a certain running-in time for reaching a steady state.

A purpose of the present invention is to provide a device at centreless grinding machines of the type described in the introduction, by means of which the above expressed problem with heat dependent alterations of the size of the grinding gap, is eliminated to a very high extent.

Another purpose of the invention is to render possible designing of shorter, and thereby less heavy and less space-requiring centreless grinding machines. These and other advantages, which will be apparent from the following description, have been achieved in that the said carriages are arranged in an overlap relation thus that one supporting point for one of the said carriages is situated between the two supporting points for the other carriage, for the purpose of compensating thermally dependent length variations at said carriages.

Hereinafter the invention will be further described with reference to embodiments shown in the accompanying drawings.

DETAILED DESCRIPTION OF THE PREFERRED EMBODIMENTS

Figure 1:
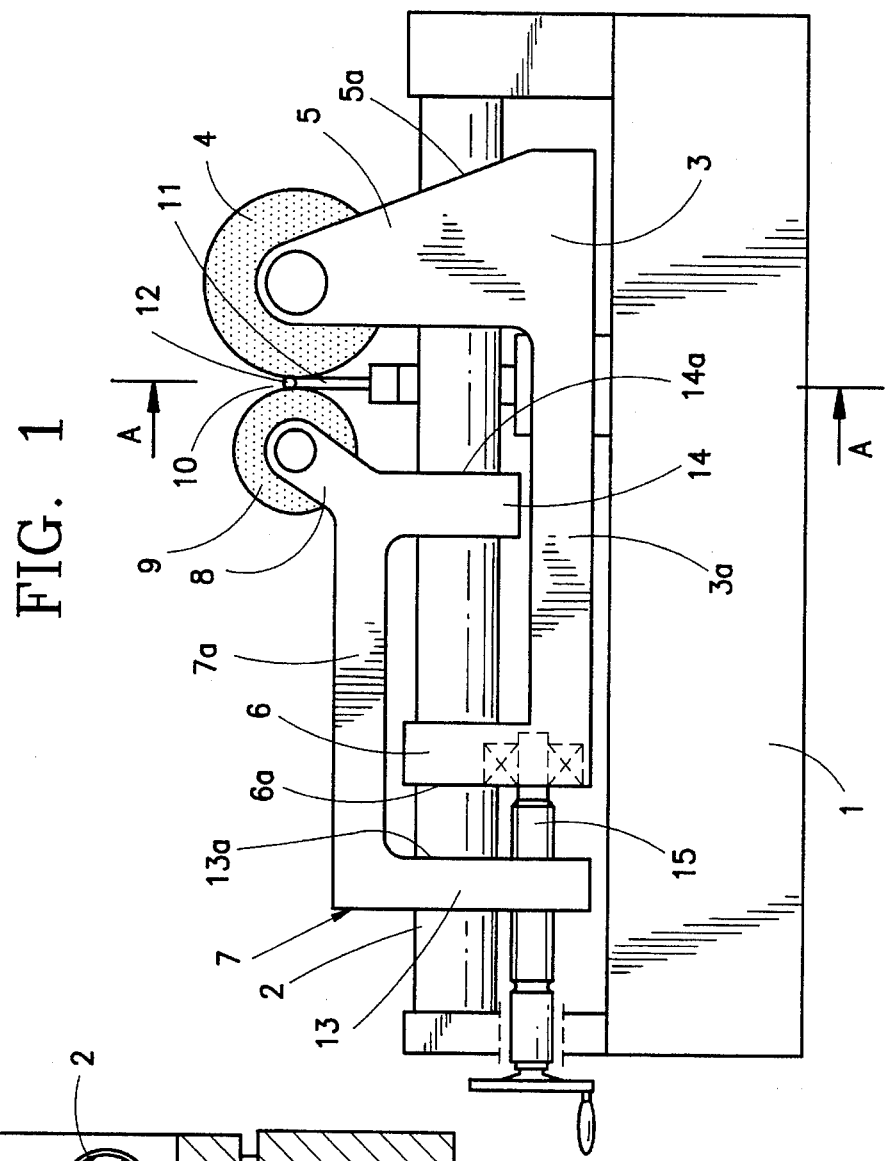
FIG. 1 shows in a schematic planar view a centreless grinding machine having a device according to the invention.

The centreless grinding machine shown in FIG. 1 is illustrated schematically with its main components, and with details relevant to the invention. Dressing apparatuses for dressing or trueing the grinding and regulating wheels, and which might be of different designs without having influence on the invention, are for instance thus not shown.

Figure 2:
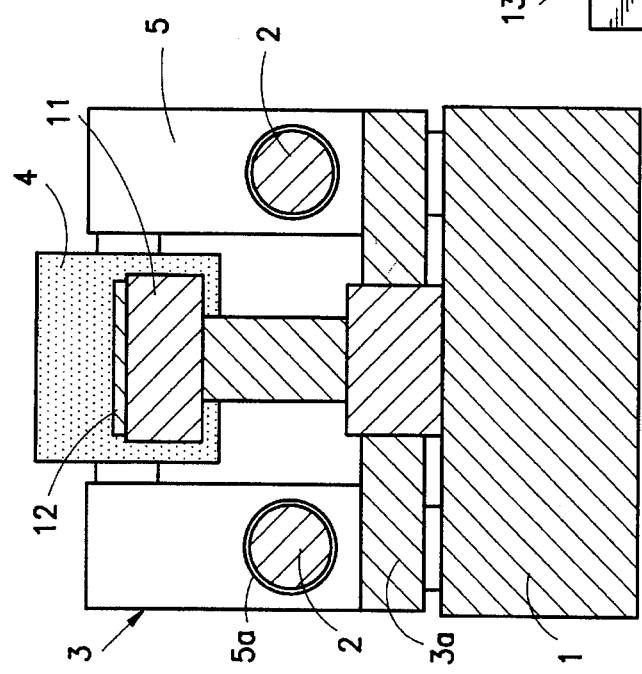
FIG. 2 is a section along line A—A in FIGS. 1 and 3.

The machine according to the invention incorporates a machine frame 1, which supports two parallel, substantially horizontal guides 2, fixedly fitted thereto. On these guides is displaceably supported a grinding wheel carriage 3, which supports a grinding wheel 4, and which grinding wheel carriage on each one of the two guides 2 (see FIG. 2) is supported at two spaced apart supporting points 5a and 6a, respectively. For this purpose the grinding wheel carriage is designed with an elongated body portion 3a having at its opposite ends brackets 5 and 6 projecting therefrom and arranged in pairs, and in which said supporting points are provided to support the grinding wheel at both sides in the brackets 5. Due to this double-sided supporting of the grinding wheel carriage 3 in spaced apart supporting points provided on both sides, a much higher is obtained as compared to conventional machines, where the engagement of the carriage against the guides is determined only by the inherent mass of the carriage.

On the guides 2 there is furthermore displaceably supported a regulating wheel carriage 7, which incorporates an elongated body portion 7a from which projects a pair of brackets 8 in which is supported a regulating wheel 9, which together with the grinding wheel 4 defines a grinding gap 10, in which is provided a work support 11 adapted to support the workpiece 12 subjected to treatment in the grinding gap. The body portion 7a of the reglating wheel carriage furthermore has two downward projecting pairs of brackets 13, 14 provided at opposite ends of the body portion and in which are arranged spaced apart supporting points 13a, 14a, by means of which the regulating wheel carriage is slidably supported on the guides 2. Like in the case with the grinding wheel carriage the four-point supporting of the regulating wheel carriage on the guides 2 gives a very stiff structural design, which actively contributes to a high accuracy of setting and adjustment.

As can be seen from FIG. 1 the grinding wheel carriage 3 and the regulating wheel carriage 7 are so arranged with their brackets 5, 6 and 13, 14 on the guides 2 relative to each other that one of the pairs of supporting points of one of the two carriages—in the embodiment shown the supporting points 14a, which are provided in the brackets 14 that are situated closest to the brackets 8 supporting the regulating wheel 9—are situated between the two supporting points of the other carriage, thus that an overlap relation is created between the carriages 3, 7. The two overlapped carriages 3, 7 in the embodiment shown in FIG. 1, are operated and held in position relative to each other by means of a conventional feed control screw 15.

Due to this overlapping arrangement of the two carriages, the two carriages during the running-in sequence of the centreless grinding machine will expand substantially the same distance in the same direction, whereby the distance between the two carriages and thereby between the grinding wheel and the regulating wheel will be altered only to an insignificant extent due to influence of the heat created during grinding. The movements of the frame due to the heat release has influence only on the relative position of the grinding gap, without effecting the size thereof, and this has less importance for the grinding result.

Due to such an arrangement, the running-in time for the machine is reduced thoroughly, which means that the machine designed in accordance with the device according to the invention will be better suited for grinding short series of workpieces as compared to a conventional machine.

Due to the two-side supporting of the grinding wheel carriage 3 as well as of the regulating wheel carriage 7 it is possible to design the machine with a substantially higher stiffness in the grinding gap as compared to a conventional machine, which is a fact of decisive importance for production capacity as well as for precision.

Due to the overlapping arrangement, the machine according to the invention can also be built substantially shorter than corresponding, conventional centreless grinding machines. Hereby is gained a saving in weight, which has an influence on the machine cost, and the space requirement for the mounted, ready-for-operation machine is also reduced, which also is of big economical importance.

Figure 3:
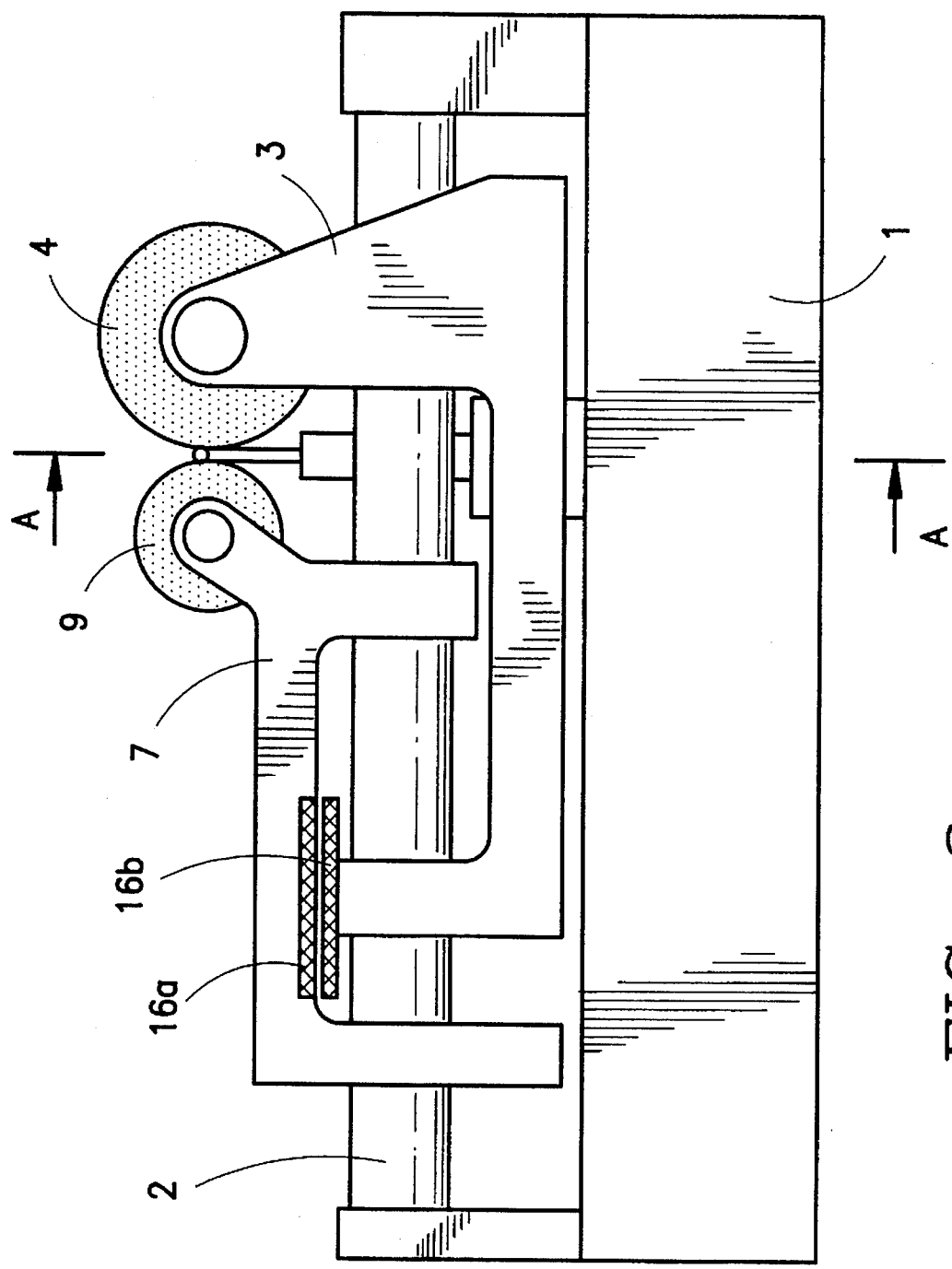
FIG. 3 shows in a view corresponding to FIG. 1 a slightly modified embodiment of a device according to the invention.

In FIG. 3 is shown, in a view corresponding to FIG. 1, an alternative embodiment,, where the overlapping arrangement between grinding wheel carriage and regulating wheel carriage is the same as in the embodiment according to FIG. 1. The difference between the two embodiments is that in the machine according to FIG. 3 the feed control screw 15 has been replaced for an electro-magnetic linear drive means, the cooperating components 16a and 16b of which are schematically illustrated on the regulating wheel carriage 7 and on the grinding wheel carriage 3, and which together are arranged to provide a mutual feeding movement between the two carriages.

The invention is not limited to the embodiments shown in the drawings and described in connection thereto but modifications and variations are possible within the scope of the appended claims.

I claim:
1. A centreless grinding machine comprising:
a frame,
guides on said frame,
a regulating wheel carriage displaceably supported on the guides,
a regulating wheel supported by said regulating wheel carriage,
a grinding wheel carriage displaceably supported on the guides,
a grinding wheel supported by said grinding wheel carriage,
said regulating and grinding wheels defining a grinding gap between them of adjustable size,
a work support provided in the grinding gap,
each of said grinding and regulating wheel carriages having at least two spaced apart supporting points relative to the guides,
said carriages arranged in an overlapping relation such that one supporting point of one of said carriages is situated between the two supporting points of the other carriage for compensating thermally dependent length variations at said carriages.

2. The device as claimed in claim 1, wherein the two carriages arranged in an overlapping relation to each other are controlled and positionally located relative to each other by means of a feed control screw for feeding one of the carriages.

3. The device as claimed in claim 1, wherein the two carriages arranged in an overlapping relation to each other are controlled and positionally located relative to each other by means of cooperating components of an electromagnetic lineary drive device arranged in the carriages.

4. The device as claimed in claim 1, wherein each carriage is supported on opposite sides of the carriage on the guides, said guides provided in parallel with each other in the frame.

5. The device as claimed in claim 2, wherein each carriage is supported an opposite sides of the carriage on the guides, said guide provided in parallel with each other in the frame.

6. The device as claimed in claim 3, wherein each carriage is supported on opposite sides of the carriage on the guides, said guide provided in parallel with each other in the frame.

* * * * *